United States Patent
Zhang

(10) Patent No.: US 7,388,222 B2
(45) Date of Patent: Jun. 17, 2008

(54) HIGH-TEMPERATURE OPTICAL LIQUID LEVEL SENSOR

(75) Inventor: Wenwei Zhang, Bellshill (GB)

(73) Assignee: Honeywell International Inc., Morristown, NJ (US)

( * ) Notice: Subject to any disclaimer, the term of this patent is extended or adjusted under 35 U.S.C. 154(b) by 55 days.

(21) Appl. No.: 11/304,189

(22) Filed: Dec. 15, 2005

(65) Prior Publication Data

US 2007/0145309 A1   Jun. 28, 2007

(51) Int. Cl.
*G01N 15/06* (2006.01)
(52) U.S. Cl. .................. 250/577; 250/900
(58) Field of Classification Search ........ 250/573–575, 250/577, 900–908, 227.14, 227.21, 227.25; 73/290 R, 293; 116/109; 137/386, 392; 340/618, 619
See application file for complete search history.

(56) References Cited

U.S. PATENT DOCUMENTS

| | | | | |
|---|---|---|---|---|
| 4,407,561 A | * | 10/1983 | Wysocki | 385/128 |
| 4,713,552 A | * | 12/1987 | Denis et al. | 250/577 |
| 4,884,450 A | * | 12/1989 | Greenwood et al. | 73/702 |
| 4,961,069 A | * | 10/1990 | Tsaprazis | 340/619 |
| 5,399,876 A | * | 3/1995 | LaClair | 250/577 |
| 5,880,480 A |   | 3/1999 | Ellinger et al. | 250/577 |
| 5,946,084 A | * | 8/1999 | Kubulins | 356/128 |

FOREIGN PATENT DOCUMENTS

GB  2 036 326  *  6/1980

* cited by examiner

*Primary Examiner*—Georgia Y. Epps
*Assistant Examiner*—Pascal M Bui-Pho
(74) *Attorney, Agent, or Firm*—Roberts & Roberts, LLP

(57) ABSTRACT

The invention provides an optical liquid level sensor used to determine the level of a liquid within a vessel. The sensor includes two adjacent elongated optical elements, such as optical fibers, which connect a first end, or "sensing end", to a second end, or "non-sensing end". The sensing end includes an optical lens for sensing the level of a high temperature liquid, while the non-sensing end includes electronic components for processing optical signal data relating to the sensed liquid level. The ends are sufficiently separated by the elongated optical elements, such that high temperatures exerted on the sensing end when it is immersed in high-temperature liquid are not exerted on the non-sensing end. This configuration avoids the temperature degradation of the electronic components, thus extending the lifetime of the sensor.

18 Claims, 3 Drawing Sheets

HIGH-TEMPERATURE OPTICAL LIQUID LEVEL SENSOR

BACKGROUND OF THE INVENTION

1. Field of the Invention

The present invention relates to liquid level sensors. In particular, it relates to optical liquid level sensors capable of withstanding immersion in high temperature liquids.

2. Description of the Related Art

Liquid level sensors are widely used in various fields of art, including civil, military, automotive and aerospace applications. In many situations, liquids are not permitted to fall below a predetermined level, such as in automobile radiators, fluid containers, and engines. In other situations, a liquid level must be monitored to not reach too high of a level, such as in a holding tank. Applications for liquid level sensors are also found where a liquid is extremely corrosive, such as in chemical reagent reservoirs.

Many different types of liquid level sensors are known in the art. Often, the level of a liquid in a vessel is detected through the use of a float with a mechanical or magnetic coupling to an external gauge, an ultrasonic or optical transducer which measures time of flight to deduce the liquid level, or a parallel wire capacitance sensor which monitors the change in the dielectric constant between the wires associated with a change in liquid level.

Conventional optical liquid level sensors are also known. These sensors utilize an optical prism as a sensing component for detecting the presence or absence of liquid. Typically, a light source and photodiode are closely linked to the optical prism. Divergent light from the light source hits a top surface of the optical prism. If there is no liquid around the optical prism, most of the light will come back to the photodiode due to total internal reflection. On the other hand, if liquid submerges the optical prism, far less light will come back to the photodiode.

A particular problem associated with conventional optical liquid level sensors is their inability to withstand high temperatures. This is particularly caused by the close proximity of the sensor's opto-electronic components (light source, photodiode, electronic circuits) to a high temperature environment such as high temperature liquid. Most opto-electronic components work well at room temperature, but experience degradation and/or failure as temperatures rise above 85° C. during work applications. Furthermore, while some light sources, photodiodes, and electronic circuits are claimed to operate at temperatures of up to 125° C. they are very costly and not readily available. In addition, performances and lifetimes of these opto-electronic components are unreliable and often fail at temperatures approaching 125° C.

Clearly, a need for further improvement exists in the art of liquid level sensors, particularly in the production of sensors which are able to withstand high temperatures while still being lower in cost to produce. The present invention provides a solution to this problem. The invention provides an optical liquid level sensor capable of withstanding temperatures higher than conventionally known liquid level sensors. The inventive sensors can withstand liquid temperatures of about 400° C. or greater, and preferably about 1100° C. or greater.

The inventive liquid level sensors provide an inexpensive alternative to conventional liquid level sensors, since less expensive materials may be used. The inventive design avoids the temperature degradation of the electronic components, thus extending the lifetime of the overall sensor apparatus.

SUMMARY OF THE INVENTION

The invention provides an optical liquid level sensor which comprises:

a) an elongated optical transmitter element having a first end and a second end, for transmitting optical signals from its second end to its first end, and an adjacent elongated optical receiver element having a first end and a second end for receiving reflected optical signals at its first end and transmitting the reflected optical signals to its second end;

b) a coupler for holding together the first end of the optical transmitter element to the first end of the optical receiver element, to thereby form a coupled optical element end;

c) an optical lens on the coupled optical element end, which optical lens is capable of receiving optical signals from the second end of the optical transmitter element, forming reflected optical signals therefrom, and passing the reflected optical signals into the first end of the optical receiver element;

d) a light source at or near a second end of the optical transmitter element, which light source is capable of receiving outgoing signal information from a processor and transmitting outgoing optical signals to the optical lens via the optical transmitter element;

e) a photoreceiver at or near a second end of the optical receiver element, which photoreceiver is capable of receiving reflected optical signals from the optical receiver element, and which photoreceiver is capable of sending reflected signal information to a processor; and f) a processor attached to the light source and to the photoreceiver, which processor is capable of transmitting outgoing signal information to the light source, receiving reflected signal information from the photoreceiver, and processing reflected signal information.

The invention also provides an optical liquid level sensor which comprises:

a) an elongated optical transmitter element having a first end and a second end, for transmitting optical signals from its second end to its first end, and an adjacent elongated optical receiver element having a first end and a second end for receiving reflected optical signals at its first end and transmitting the reflected optical signals to its second end, wherein each of the optical transmitter element comprise at least one optical fiber having a melting and/or degradation temperature of about 400° C. or greater;

b) a glass ring coupler for holding together the first end of the optical transmitter element to the first end of the optical receiver element, to thereby form a coupled optical element end;

c) an optical lens on the coupled optical element end, which optical lens is capable of receiving optical signals from the second end of the optical transmitter element, forming reflected optical signals therefrom, and passing the reflected optical signals into the first end of the optical receiver element, which optical lens comprises a material having a melting and/or degradation temperature of about 400° C. or greater;

d) a light emitting diode at or near a second end of the optical transmitter element, which light emitting diode is capable of receiving outgoing signal information from a processor and transmitting outgoing optical signals to the optical lens via the optical transmitter element;

e) a photodiode at or near a second end of the optical receiver element, which photodiode is capable of receiving reflected optical signals from the optical receiver element, and which photodiode is capable of sending reflected signal information to a processor; and f) a processor attached to the light emitting diode and to the photodiode, which processor is capable of transmitting outgoing signal information to the light emitting diode, receiving reflected signal information from the photodiode, and processing reflected signal information.

The invention further provides a method of sensing the depth of a liquid which comprises:

I) providing an optical liquid level sensor which comprises:
  a) an elongated optical transmitter element having a first end and a second end, for transmitting optical signals from its second end to its first end, and an adjacent elongated optical receiver element having a first end and a second end for receiving reflected optical signals at its first end and transmitting the reflected optical signals to its second end;
  b) a coupler for holding together the first end of the optical transmitter element to the first end of the optical receiver element, to thereby form a coupled optical element end;
  c) an optical lens on the coupled optical element end, which optical lens is capable of receiving optical signals from the second end of the optical transmitter element, forming reflected optical signals therefrom, and passing the reflected optical signals into the first end of the optical receiver element;
  d) a light source at or near a second end of the optical transmitter element, which light source is capable of receiving outgoing signal information from a processor and transmitting outgoing optical signals to the optical lens via the optical transmitter element;
  e) a photoreceiver at or near a second end of the optical receiver element, which photoreceiver is capable of receiving reflected optical signals from the optical receiver element, and which photoreceiver is capable of sending reflected signal information to a processor; and
  f) a processor attached to the light source and to the photoreceiver, which processor is capable of transmitting outgoing signal information to the light source, receiving reflected signal information from the photoreceiver, and processing reflected signal information;

II) immersing at least a portion of the optical lens into a vessel, which vessel optionally contains a liquid;

III) sending outgoing signal information from the processor to the light source, thereby causing an outgoing optical signal to be transmitted from the light source to the optical lens via the optical transmitter element;

IV) forming reflected optical signals at the optical lens, and passing the reflected optical signals into the first end of the optical receiver element;

V) receiving the reflected optical signal into the photoreceiver from the optical receiver element;

VI) sending reflected signal information from the photoreceiver to the processor; and VII) processing the reflected signal information via the processor.

DETAILED DESCRIPTION OF THE INVENTION

The invention provides an optical liquid level sensor used to determine the level of a liquid within a vessel. The inventive sensor assembly includes two adjacent elongated optical elements which connect a second end, or "sensing end" of the sensor assembly, to a first end, or "non-sensing end" of the sensor assembly. The sensing end includes an optical lens which is designed to come into contact with a high temperature liquid, in the sensing of liquid levels. The non-sensing end includes electronic components for processing signal data, and is not intended to come into contact with high temperatures. An important feature of the invention is that the sensing end and the non-sensing end are sufficiently separated by the elongated optical elements, such that high temperatures exerted on the sensing end, when it is in contact with a high-temperature liquid, are generally not exerted on the non-sensing end. The configuration of this invention avoids temperature degradation of the light source and photoreceiver, thus extending the lifetime of the sensor. While the figures show a preferred configuration of the invention, alternate configurations may be contemplated by those skilled in the art.

Figure 1:
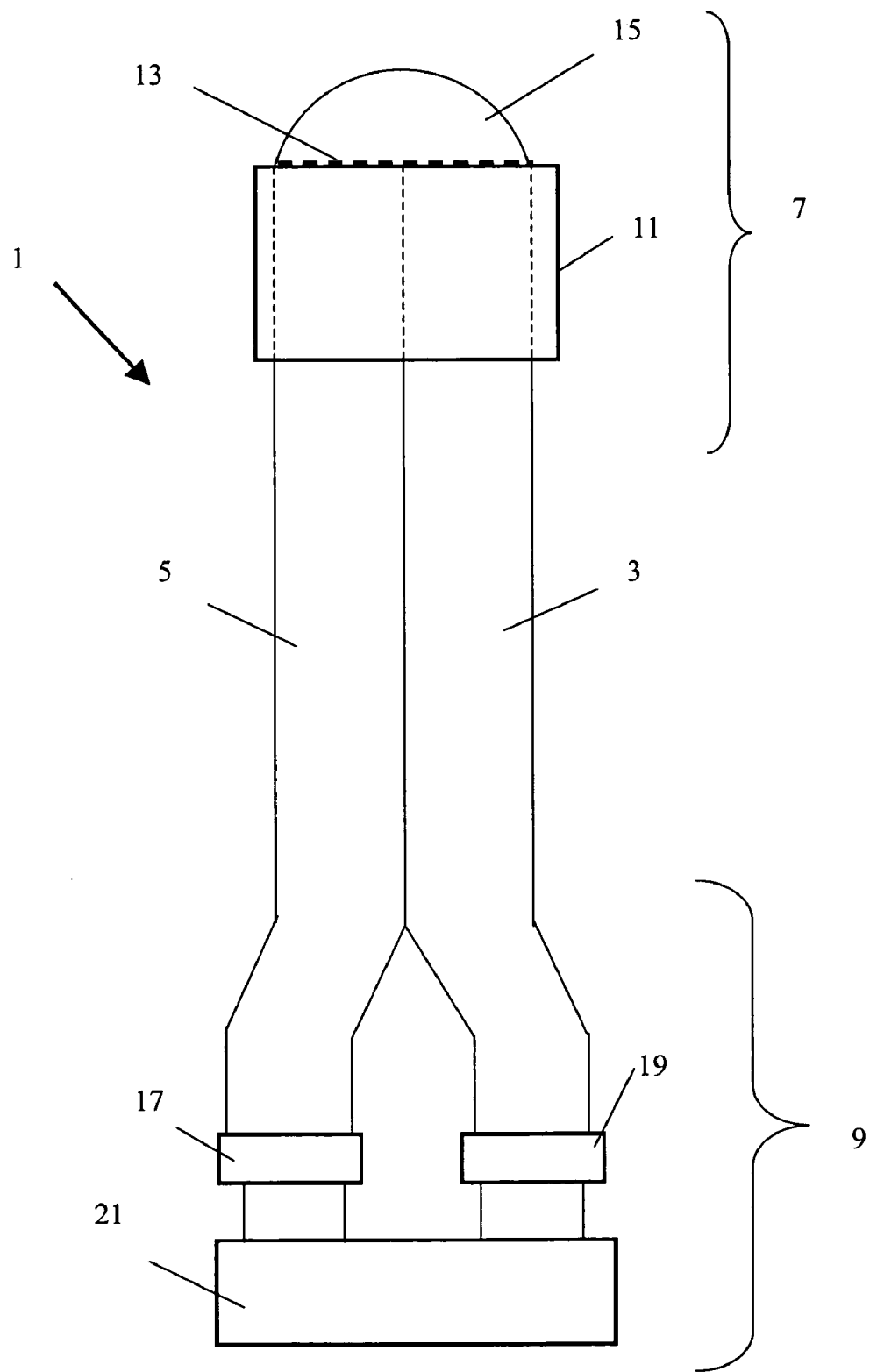
FIG. 1 provides a schematic representation of a liquid level sensor of the invention.

As shown in FIG. 1, the optical liquid level sensor 1 includes an elongated optical transmitter element 5, having a first end and a second end, for transmitting optical signals. Adjacent to the optical transmitter element 5 is an elongated optical receiver element 3, having a first end and a second end, for receiving reflected optical signals at its first end and transmitting the reflected optical signals to its second end.

The elongated optical elements 3 and 5 serve as transmission system for light, and may comprise any suitable form or material which is known in the art to transmit optical signals therethrough. Preferably the optical transmitter element 5 and the optical receiver element 3 have substantially the same form. The optical elements 3 and 5 may be present in a variety of forms such as individual optical fibers, bundles of optical fibers, solid glass rods, hollow glass tubes filled with liquid or gas, and the like. In one embodiment, each of the optical transmitter element 5 and the optical receiver element 3 comprise a glass rod. In another embodiment, each of the optical transmitter element 5 and the optical receiver element 3 comprise at least one optical fiber. Optical fibers are well known in the art, and are readily commercially available. Optical fiber materials are discussed below.

The elongated optical elements 3 and 5 may be selected from a variety of conventional optical materials, which may be chosen specifically by those skilled in the art in order for the sensor to withstand high temperatures. The temperature limit of the inventive liquid level sensor 1 typically corresponds to the melting and/or degradation temperature of the components of the sensing end 7. That is, the sensor is typically operable at temperatures as high as the sensing end 7 can withstand.

The optical transmitter element 5 and the optical receiver element 3 preferably comprise a material having a melting and/or degradation temperature of about 400° C. or greater, more preferably about 600° C. or greater. In a most preferred embodiment, the optical transmitter element 5 and the optical receiver element 3 preferably comprise a material having a melting and/or degradation temperature of from about 1100° C. or greater.

Some suitable materials which may be independently chosen for the optical transmitter element and/or the optical receiver element comprise silica, doped silica such as thulium-doped silica, borosilicate, optical epoxy, glass, coated silica such as polyimide coated silica, coated borosilicate such as polyimide coated borosilicate, sapphire and combinations thereof. In a preferred embodiment, the optical transmitter element 5 and/or the optical receiver element 3 comprise a borosilicate material. In a preferred embodiment, the optical transmitter element and the optical receiver element 3 comprise substantially the same material. In a most preferred embodiment, the optical transmitter element 5 and the optical receiver element 3 have substantially the same index of refraction.

Examples of suitable optical fiber materials nonexclusively include polyimide coated silica fibers, which may be operable at temperatures of up to about 400° C., and borosilicate optical fibers, which may be operable at temperatures of up to about 600° C. Other optical fibers may be used which are operable at higher temperatures, such as thulium-doped silica fibers which may be operable at temperatures of up to 1100° C. Higher temperature resistant materials such as thulium-doped silica fibers are very expensive, so it is possible to splice these expensive fibers with a less expensive fiber, such as a borosilicate fiber, after the working temperature drops.

The distance between the sensing end 7, which is to be immersed in a high-temperature liquid, and the electronic components of the non-sensing end 9, as described below, is another factor which allows the sensor 1 to operate at temperatures as high as the sensing end 7 can withstand. The ends are sufficiently separated by the optical elements 3 and 5, such that high temperatures exerted on the sensing end 7 when it is immersed in high-temperature liquid are not exerted on the non-sensing end 9. The length of the optical elements 3 and 5 may range from about 1 cm in length to about 100 km in length, depending on intended use. In some applications, the elongated optical element length ranges from about 1 cm to about 500 m. In other applications, the elongated optical element length ranges from about 500 m to about 5 km. In still other applications, the elongated optical element length ranges from about 5 km to about 100 km. The length of the optical elements 3 and 5 may vary according to use, materials used, and other parameters. The diameter of these optical elements may also vary according to use, materials, and the like.

In certain preferred embodiments, the optical elements comprise optical fibers. Typically, optical fibers may comprise single mode optical fiber or multimode optical fiber. With single mode polyimide coated silica fibers, for example, the fiber length may reach up to 100 km in length without affecting the performance of liquid level sensor. Thus, liquid level can be monitored at distances of up to 100 km. However, it is costly due to the fiber length and the corresponding laser light source required. With multi-mode fibers, the fiber length may reach about 500 meters in length without affecting the performance of liquid level sensor, which means that liquid level can be monitored at distances of about 500 meters. Due to shorter fiber length and the type of light source required, a multimode optical fiber may be a less expensive option.

The width or diameter of these optical fibers may vary based on different applications. In one embodiment, the optical fiber width or diameter ranges from about 0.125 mm to about 2 mm for a single fiber, or multiple fibers may be bundled together. In another embodiment, over 100 optical fibers are bundled together to form a single optical fiber bundle. Optical fiber bundles may be glued together, or attached together in a jacket, or the like. Such jackets may be rigid or flexible.

Another component of the inventive liquid level sensor is a coupler. FIG. 1 shows a coupler 11 at the sensing end 7, which coupler 11 serves to hold together the second end of the optical transmitter element 5 to the second end of the optical receiver element 3, to thereby form a coupled optical element end 13. The coupler 11 may comprise any suitable coupling means for holding the elongated optical elements together at the sensing end 7. The coupler 11 may be present in any suitable shape such as a ring, a clip, a holding container, or the like. Some suitable materials which may be chosen for the coupler 11 comprise metal, glass, silica, doped silica, borosilicate, sapphire, coated silica such as polyimide coated silica, coated borosilicate such as polyimide coated borosilicate, and combinations thereof, or any other material capable of withstanding the high temperatures exerted on the elongated optical elements and lens of the sensing end 7. In a preferred embodiment, the coupler 11 comprises a high temperature glass ring. Preferably, the coupler 11 comprises a material having a substantially similar coefficient of thermal expansion (CTE) as the materials of the optical elements 3 and 5. This serves to maintain the optical elements 3 and 5 at a fixed relative position during different temperature ranges. The coupler typically has no requirements of optical performance. The coupler 11 may or may not comprise the same material as that of the optical elements 3 and 5, including those materials described above for the optical elements 3, 5. In a further embodiment, a high temperature glue is used to secure the coupler 11 to the optical elements 3, 5.

As shown in FIG. 1, an optical lens 15 is present on the coupled optical element end 13, which optical lens is capable of receiving optical signals from the second end of the optical transmitter element 5, forming reflected optical signals therefrom, and passing the reflected optical signals into the second end of the optical receiver element 3. The lens 15 is preferably present on the coupled optical element end 13, but may alternatively be present on an end of the coupler 11. The lens may be present in any shape or size determined to be suitable by those skilled in the art. In one embodiment, the lens is present in the form of a hemispherical dome.

The lens 15 may be formed on the coupled optical element end 13 in a variety of ways. In one embodiment of the invention, the lens 15 is printed onto the coupled optical element end 13. Such a printing method uses an ink-jet type method to print an optical epoxy material onto the coupled optical element end 13, or alternatively onto a top of the coupler 11, such that the coupled optical element end or the coupler performs similarly to a dome lens. Generally, a printed lens has a limited temperature range. However, such integrated lenses are smaller than a microlens, and can be provided at lower costs.

In another embodiment, the lens comprises a pre-formed microlens which is attached onto the coupled optical element end 13 or the coupler 11. Such a microlens may be attached by gluing and curing a pre-formed microlens, such as a glass microlens, onto the coupled optical element end 13, or alternatively onto a top of the coupler 11. The microlens may alternatively be attached by laser-welding a pre-formed microlens onto the coupled optical element end 13, or onto a top of the coupler 11. Although more costly than the printing method, such attachment methods allow the sensor to work at very high temperatures.

The lens 15 may be selected from a variety of conventional optical materials, which may be chosen specifically by those skilled in the art in order for the inventive sensor to withstand high temperatures. Some suitable materials which may be chosen for the lens 15 comprise silica, sapphire, doped silica such as thulium-doped silica, borosilicate, optical epoxy, glass, coated silica such as polyimide coated silica, coated borosilicate such as polyimide coated borosilicate, and combinations thereof. In a preferred embodiment, lens 15 comprises a borosilicate material. The lens 15 may or may not comprise the same material as that of the optical elements 3, 5. In one preferred embodiment, the lens 15, the optical transmitter element 5, and the optical receiver element 3 comprise substantially the same material. The lens 15 preferably comprises a material having a substantially similar coefficient of thermal expansion (CTE) as the material of the optical elements 3, 5. In a most preferred embodiment, the lens 15, the optical transmitter element 5 and the optical receiver element 3 have substantially the same index of refraction.

Temperatures at which the lens 15 can operate depend on the lens materials used. Preferably the lens 15 comprises a material having a melting and/or degradation temperature of about 400° C. or greater, more preferably about 600° C. or greater. In a most preferred embodiment, the lens 15 comprises a material having a melting and/or degradation temperature of from about 1100° C. or greater.

The non-sensing end 9 of the inventive sensor 1 includes several electronic components including light source 17, a photoreceiver 19, and a processor 21, as described below. Such electronic components are commonly used in telecommunications applications, and are typically operable at temperatures of up to 85° C. These components are not intended to be immersed in high temperature liquid and, due to the distance between the tested high temperature liquid and the electronic components, the components of the sensing end exist in an environment of about room temperature, even if the sensing end 7 experiences temperatures of up to 1100° C. or more. Thus, the temperature of a tested liquid contacting the sensing end 7 should not affect the performance of the electronic components of the non-sensing end 9.

Figure 2:
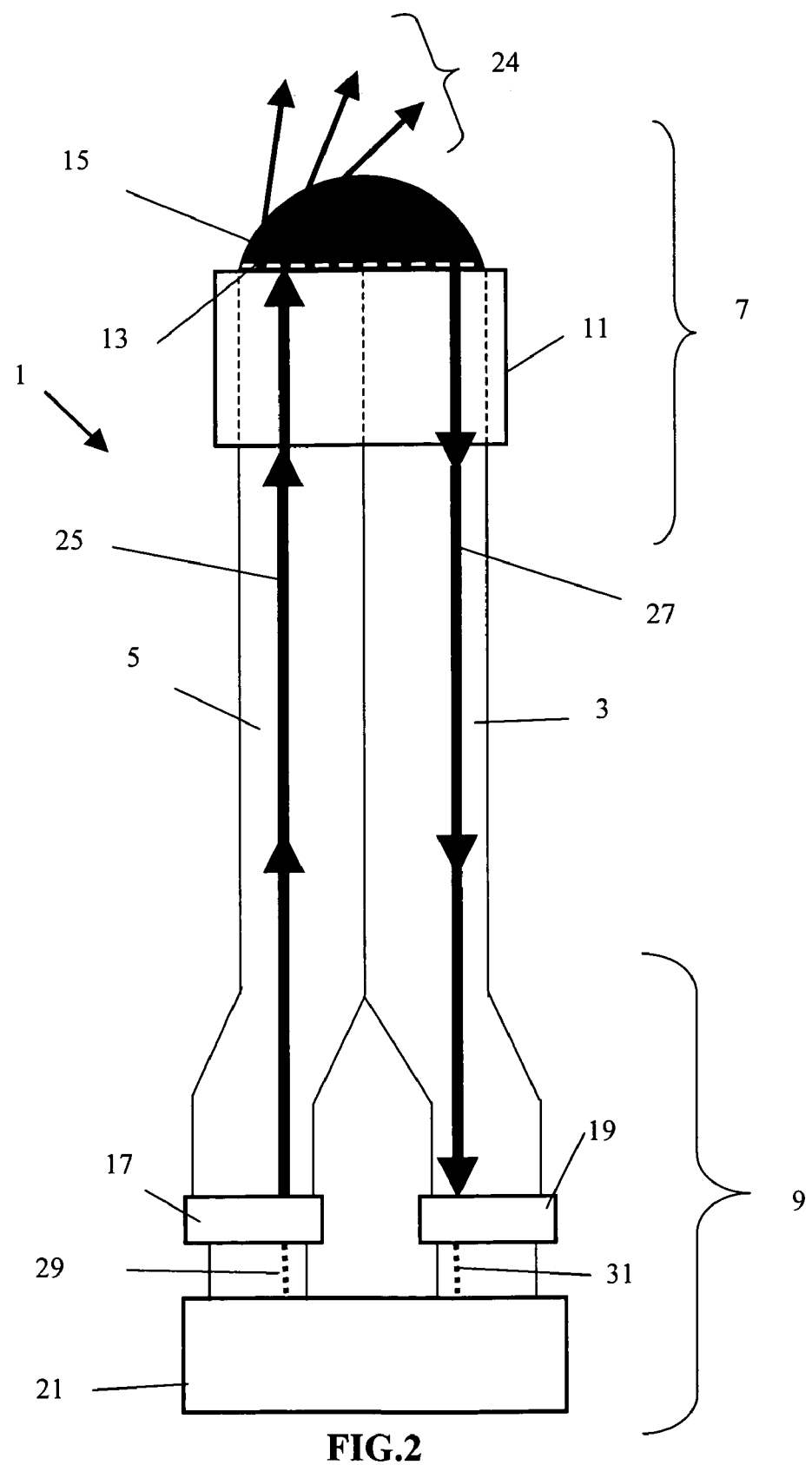
FIG. 2 shows a schematic representation of a liquid level sensor of the invention wherein no liquid is in contact with the lens when an optical signal is sent to the lens from the light source.
Figure 3:
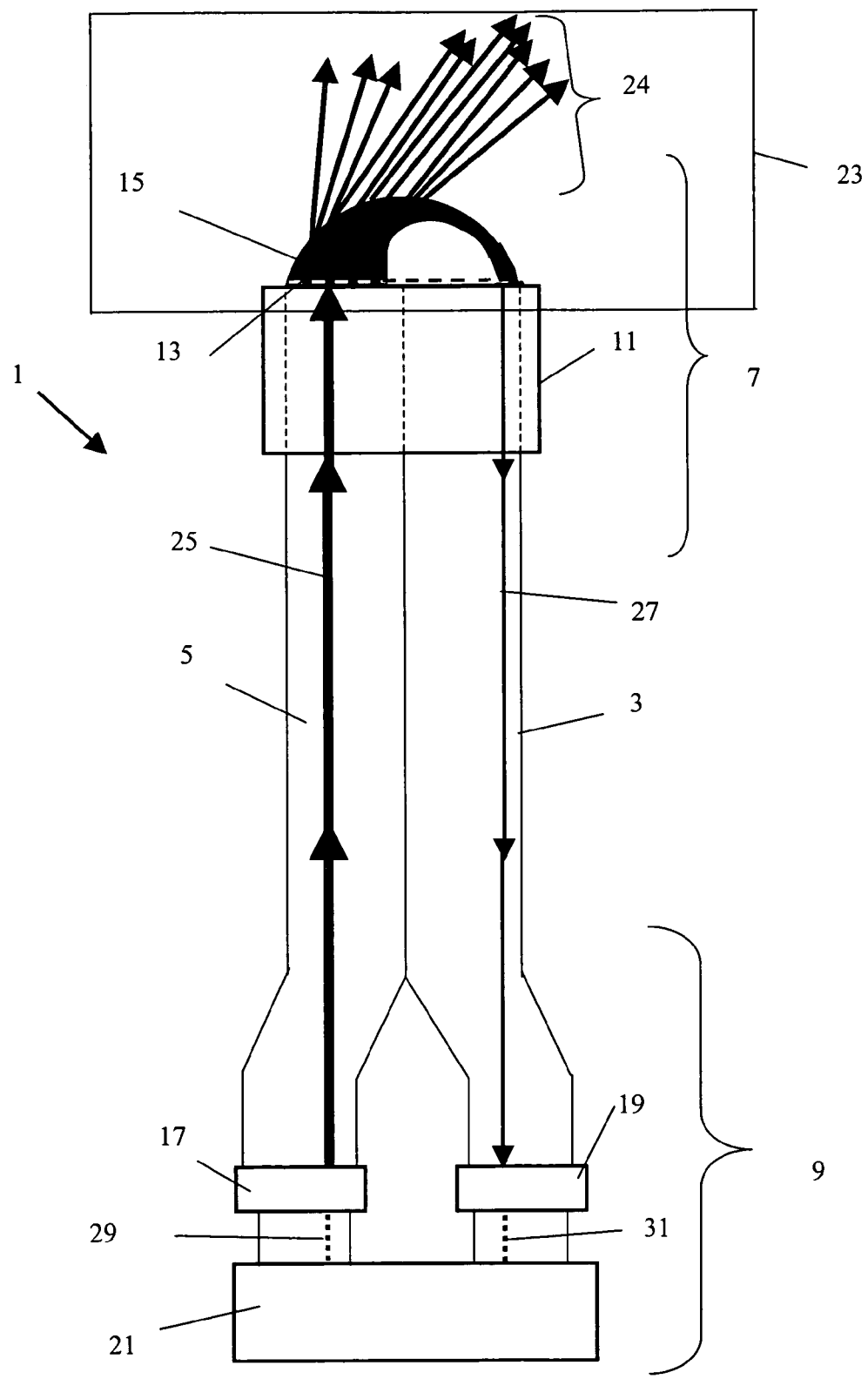
FIG. 3 shows a schematic representation of a liquid level sensor of the invention wherein liquid covers the entire lens when an optical signal is sent to the lens from the light source.

As shown in FIGS. 1-3, the non-sensing end 9 includes a light source 17 at or near a first end of the optical transmitter element 5. The light source 17 is capable of receiving outgoing signal information from a processor, described below. The light source 17 is further capable of transmitting outgoing optical signals to the optical lens 15 via the optical transmitter element 5. The light source may comprise any suitable conventionally known optical light source, preferably a light emitting diode (LED), a vertical cavity surface emitting laser (VCSEL), or a laser diode.

As also shown in FIGS. 1-3, the invention further comprises a photoreceiver 19 at or near a first end of the optical receiver element 3. The photoreceiver 19 is capable of receiving reflected optical signals from the optical receiver element 3. The photoreceiver 19 is further capable of sending reflected signal information to a processor, described below. Various photoreceivers are conventionally known and commercially available. In a preferred embodiment of this invention, the photoreceiver comprises a photodiode such as a silicon photodiode or the like.

The invention further comprises a processor 21 attached to the light source 17 and to the photoreceiver 19, as shown in FIGS. 1-3. The processor 21 is capable of transmitting outgoing signal information to the light source 17, receiving reflected signal information from the photoreceiver 19, and processing reflected signal information. The processor is preferably capable of determining and/or analyzing the presence, absence, and/or level of a liquid within a vessel, when the optical lens is immersed in said vessel. The processor is preferably electrically attached to the light source and the photoreceiver via wires or the like.

The processor typically includes a mechanism for receiving reflected signal information from the photoreceiver, an electronic circuit board or the like for processing information, and a mechanism for transmitting outgoing signal information to the light source. The sending and receiving of such signal information is described below.

The inventive liquid level sensor 1 may further comprise other components such as a power source and the like. Preferably, the liquid level sensor includes an internal power source within the processor. Other conventionally known power sources such as batteries, solar panels, or other internal or external power sources may be used in accordance with the present invention.

As stated above, the optical liquid level sensor 1 of the invention is used to sense the presence of a liquid, and if present, the depth of the liquid. In practice, an optical liquid level sensor of the invention is provided, and at least a portion of the optical lens is immersed into a vessel which optionally contains a liquid whose level is to be tested. The vessel may comprise any suitable liquid receptacles known in the art, such as containers, vats, cups, flasks, columns, engine compartments, pipes, tubes, or the like. The optical lens may optionally be immersed into a body of water instead of a vessel.

Liquids to be tested will vary according to each particular application. Examples of liquids to be tested nonexclusively include chemicals such as corrosive materials, engine fluids, oils, lubricants, organic liquids, water, beverages and the like. It is preferred that the liquid to be tested does not reach a temperature higher than the melting and/or degradation temperature of the components of the sensing end 7, which includes the above described elongated optical elements 3 and 5, the lens 15, and/or the coupler 11.

As liquid levels vary, different points on the surface of the optical lens immersed within the vessel may or may not come into contact with liquid. FIG. 3 shows a particular embodiment of the invention wherein the entire surface of the optical lens 15 is in contact with a liquid 23 within a vessel. In another embodiment, shown in FIG. 2, the optical lens 15 is not in contact with any liquid. Once the optical lens is placed in its desired position, outgoing signal information 29 is sent from the processor 21 to the light source 17. The outgoing signal information is preferably sent by the processor in the form of a pulse or direct constant (DC) signal, having a chosen current and voltage.

This outgoing signal information thereby causes an outgoing optical signal 25 to be transmitted from the light source 17 to the optical lens 15, via the optical transmitter element 5 as shown in FIG. 3.

Light is then reflected by the optical lens 15, and a reflected optical signal 27 is formed at the optical lens. The reflected optical signal 27 is passed into the second end of the optical receiver element 3. The presence or absence of liquid at certain points on the surface of lens 15 affects the strength of the reflected optical signal 27, which in turn may be used to determine the level of liquid within the vessel. For example, if no liquid is in contact with the surface of the optical lens 15, as shown in FIG. 2, most of the signal 25 will be reflected due to total internal reflection, resulting in less escaped light 24 and a stronger reflected optical signal 27. However, if liquid covers some or all of the optical lens, as shown in FIG. 3, less of the signal 25 will be reflected, resulting in more escaped light 24 and hence a weaker reflected optical signal 27.

The reflected optical signal 27 is received into the photoreceiver 19, from the optical receiver element 3, in the form of a pulse or direct constant (DC) signal. If most of the signal 25 was reflected due to total internal reflection as described above, the reflected optical signal 27 will cause a strong voltage and current of the photoreceiver output. If less of the signal 25 was reflected as described above, the reflected optical signal 27 will cause a weak voltage and current of the photoreceiver output.

Reflected signal information 31 is then sent from the photoreceiver 19 to the processor 21. The reflected signal information 31 is preferably received by the processor in the form of a pulse or direct constant (DC) signal corresponding to the current and voltage caused by the reflected optical signal 27. A current amplifier may be used to amplify the current of the incoming pulse, for example by 1000× to 100000×. Additionally, voltage thresholds may be set.

The reflected signal information 31 is then processed via the processor. The processor may then be used to determine and/or analyze the presence, absence, and/or level of liquid in the vessel. The processor may do this by comparing the reflected signal information to the outgoing signal information. In a preferred embodiment, the processor compares the current and/or voltage of the reflected signal information to the current and/or voltage of the outgoing signal information to determine and/or analyze the presence, absence, and/or level of liquid in the vessel.

The following non-limiting examples serve to illustrate the invention. It will be appreciated that variations in proportions and alternatives in elements of the components of the invention will be apparent to those skilled in the art and are within the scope of the present invention.

EXAMPLE 1

An optical liquid level sensor of the invention described above is provided, and its optical lens is immersed into the vessel containing a liquid, such that the entire lens surface is in contact with the liquid. Outgoing signal information is sent from the processor to the light source in the form of a pulse having a current of 20 milliamps and outgoing optical signal is transmitted to the optical lens. Light is reflected by the optical lens, and a reflected optical signal is formed, which signal is passed into the second end of the optical receiver element. The reflected optical signal is received into the photoreceiver in the form of a pulse causing a current of 0.01 µamp and a voltage of 1 millivolt. Reflected signal information is then sent from the photoreceiver to the processor. The processor then compares the current and voltage of the reflected signal information to the current and voltage of the outgoing signal information to determine and/or analyze the presence, absence, and/or level of liquid in the vessel.

EXAMPLE 2

An optical liquid level sensor of the invention as described above is provided, and its optical lens is immersed into the vessel, such that none of the lens surface is in contact with liquid. Outgoing signal information is sent from the processor to the light source in the form of a pulse having a current of 20 milliamps and outgoing optical signal is transmitted to the optical lens. Light is reflected by the optical lens, and a reflected optical signal is formed, which signal is passed into the second end of the optical receiver element. The reflected optical signal is received into the photoreceiver in the form of a pulse causing a current of 50 µamps and a voltage of 5 volts. Reflected signal information is then sent from the photoreceiver to the processor. The processor then compares the current and voltage of the reflected signal information to the current and voltage of the outgoing signal information to determine and/or analyze the presence, absence, and/or level of liquid in the vessel.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. An optical liquid level sensor which comprises:
    a) an elongated optical transmitter element having a first end and a second end, for transmitting optical signals from its second end to its first end, and an adjacent elongated optical receiver element having a first end and a second end for receiving reflected optical signals at its first end and transmitting the reflected optical signals to its second end, wherein each of the optical transmitter element and the optical receiver element comprise a material having a melting and/or degradation temperature of about 400° C. or greater;
    b) a coupler for holding together the first end of the optical transmitter element to the first end of the optical receiver element, to thereby form a coupled optical element end;
    c) an optical lens on the coupled optical element end, which optical lens is capable of receiving optical signals from the second end of the optical transmitter element, forming reflected optical signals therefrom, and passing the reflected optical signals into the first end of the optical receiver element;
    d) a light source at or near a second end of the optical transmitter element, which light source is capable of receiving outgoing signal information from a processor and transmitting outgoing optical signals to the optical lens via the optical transmitter element;
    e) a photoreceiver at or near a second end of the optical receiver element, which photoreceiver is capable of receiving reflected optical signals from the optical receiver element, and which photoreceiver is capable of sending reflected signal information to a processor; and
    f) a processor attached to the light source and to the photoreceiver, which processor is capable of transmitting outgoing signal information to the light source, receiving reflected signal information from the photoreceiver, and processing reflected signal information.

2. The sensor of claim 1 wherein the processor is capable of determining and/or analyzing the presence, absence, and/or level of a liquid within a vessel, when the optical lens is immersed in said vessel.

3. The sensor of claim 1 wherein each of the optical transmitter element and the optical receiver element comprise at least one optical fiber.

4. The sensor of claim 1 wherein each of the optical transmitter element and the optical receiver element comprise a glass rod.

5. The sensor of claim 1 wherein each of the optical transmitter element and the optical receiver element independently comprise a silica, doped silica, glass, borosilicate, polyimide coated silica, polyimide coated borosilicate, sapphire or combinations thereof.

6. The sensor of claim 1 wherein the optical transmitter element and/or the optical receiver element comprise a borosilicate material.

7. The sensor of claim 1 wherein the coupler comprises a glass ring.

8. The sensor of claim 1 wherein the lens comprises a material having a melting and/or degradation temperature of about 400° C. or greater.

9. The sensor of claim 1 wherein the lens comprises a silica, doped silica, glass, borosilicate, optical epoxy, polyimide coated silica, polyimide coated borosilicate, sapphire or combinations thereof.

10. The sensor of claim 1 wherein the lens comprises a borosilidate material.

11. The sensor of claim 1 wherein the lens comprises a pre-formed microlens attached to the coupled optical element end.

12. The sensor of claim 1 wherein the lens is printed on the coupled optical element end.

13. An optical liquid level sensor which comprises:
   a) an elongated optical transmitter element having a first end and a second end, for transmitting optical signals from its second end to its first end, and an adjacent elongated optical receiver element having a first end and a second end for receiving reflected optical signals at its first end and transmitting the reflected optical signals to its second end, wherein each of the optical transmitter element comprise at least one optical fiber having a melting and/or degradation temperature of about 400° C. or greater;
   b) a glass ring coupler for holding together the first end of the optical transmitter element to the first end of the optical receiver element, to thereby form a coupled optical element end;
   c) an optical lens on the coupled optical element end, which optical lens is capable of receiving optical signals from the second end of the optical transmitter element, forming reflected optical signals therefrom, and passing the reflected optical signals into the first end of the optical receiver element, which optical lens comprises a material having a melting and/or degradation temperature of about 400° C. or greater;
   d) a light emitting diode at or near a second end of the optical transmitter element, which light emitting diode is capable of receiving outgoing signal information from a processor and transmitting outgoing optical signals to the optical lens via the optical transmitter element;
   e) a photodiode at or near a second end of the optical receiver element, which photodiode is capable of receiving reflected optical signals from the optical receiver element, and which photodiode is capable of sending reflected signal information to a processor; and
   f) a processor attached to the light emitting diode and to the photodiode, which processor is capable of transmitting outgoing signal information to the light emitting diode, receiving reflected signal information from the photodiode, and processing reflected signal information.

14. A method of sensing the depth of a liquid which comprises:
   I) providing an optical liquid level sensor which comprises:
      a) an elongated optical transmitter element having a first end and a second end, for transmitting optical signals from its second end to its first end, and an adjacent elongated optical receiver element having a first end and a second end for receiving reflected optical signals at its first end and transmitting the reflected optical signals to its second end, wherein each of the optical transmitter element and the optical receiver element comprise a material having a melting and/or degradation temperature of about 400° C. or greater;
      b) a coupler for holding together the first end of the optical transmitter element to the first end of the optical receiver element, to thereby form a coupled optical element end;
      c) an optical lens on the coupled optical element end, which optical lens is capable of receiving optical signals from the second end of the optical transmitter element, forming reflected optical signals therefrom, and passing the reflected optical signals into the first end of the optical receiver element;
      d) a light source at or near a second end of the optical transmitter element which light source is capable of receiving outgoing signal information from a processor and transmitting outgoing optical signals to the optical lens via the optical transmitter element;
      e) a photoreceiver at or near a second end of the optical receiver element, which photoreceiver is capable of receiving reflected optical signals from the optical receiver element, and which photoreceiver is capable of sending reflected signal information to a processor; and
      f) a processor attached to the light source and to the photoreceiver, which processor is capable of transmitting outgoing signal information to the light source, receiving reflected signal information from the photoreceiver, and processing reflected signal information;
   II) immersing at least a portion of the optical lens into a vessel, which vessel optionally contains a liquid;
   III) sending outgoing signal information from the processor to the light source, thereby causing an outgoing optical signal to be transmitted from the light source to the optical lens via the optical transmitter element;
   IV) forming reflected optical signals at the optical lens, and passing the reflected optical signals into the first end of the optical receiver element;
   V) receiving the reflected optical signal into the photoreceiver from the optical receiver element;
   VI) sending reflected signal information from the photoreceiver to the processor; and
   VII) processing the reflected signal information via the processor.

15. The method of claim 14, further comprising the subsequent step of determining and/or analyzing the presence, absence, and/or level of liquid in the vessel.

16. The method of claim 14, wherein each of the optical transmitter element and the optical receiver element comprise at least one optical fiber.

17. The method of claim 14, wherein the coupler comprises a glass ring.

18. The method of claim 14, wherein the lens comprises a material having a melting and/or degradation temperature of about 400° C. or greater.

* * * * *